No. 701,740. Patented June 3, 1902.
E. KEMPSHALL.
GOLF BALL.
(Application filed Apr. 29, 1902.)
(No Model.)

*Fig. 2.* *Fig. 3.*

Witnesses:
Ralph Lancaster
Fred O. Maynard

Inventor:
Eleazer Kempshall
By his Attorney
F. H. Richards

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 701,740, dated June 3, 1902.

Application filed April 29, 1902. Serial No. 105,127. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to playing-balls; and its principal object is to provide for the construction at low cost of a ball having qualities which render it suitable for the game of golf.

Figure 1:
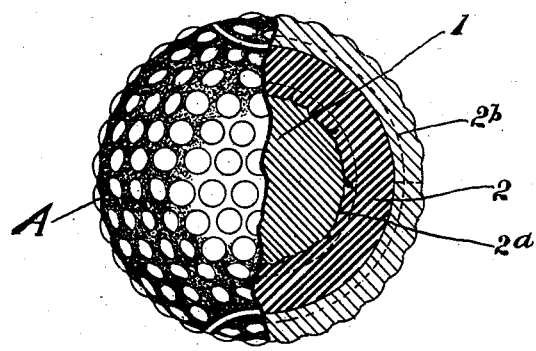
Figure 1:
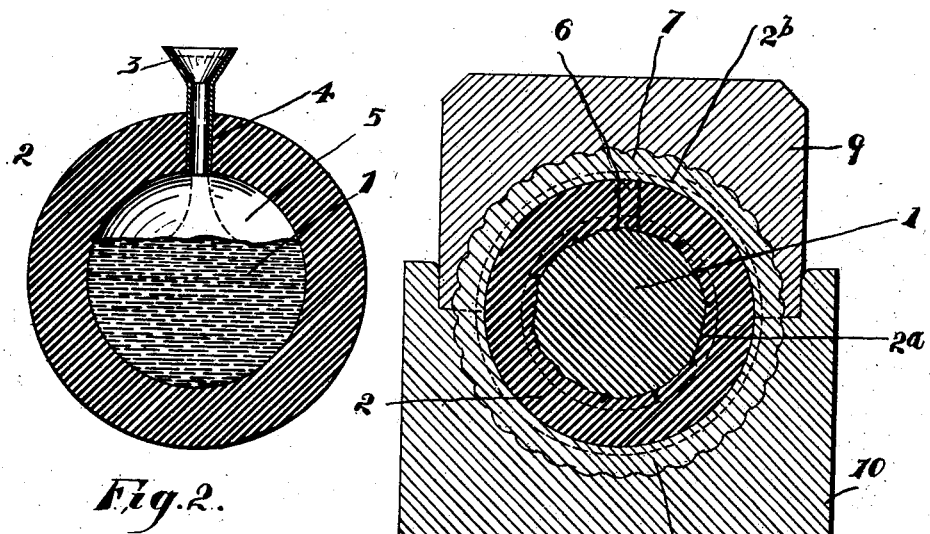

In the accompanying drawings, Figure 1 is a view, partly in section, of a ball made in accordance with my present improvements. Fig. 2 shows the preferred manner of combining a hard center piece and a rubber shell or envelop. Fig. 3 illustrates the final stage in the preferred method of producing the ball.

In the several views similar parts are designated by similar characters of reference.

For the center piece or core 1 of the ball I prefer to use springy material—such, for instance, as gutta-percha—which is preferably introduced in a fluid condition within a seamless soft-rubber shell 2, as by means of a funnel 3, inserted through a perforation 4 in said shell. The quantity of gutta-percha introduced is, however, insufficient to fill the cavity 5 of the shell, and hence forms an undersized core therein. Upon withdrawing the funnel the hole 4 may be loosely filled by rubber or other material 6. Upon the ball thus formed I place hemispherical segments 7 and 8 of plastic material—such as gutta-percha or celluloid, preferably the former—compressing and welding the same together by means of heating-dies 9 and 10, thereby forming a substantial shell which holds the rubber sphere in a state of compression. Owing to the compressing action of the dies the rubber sphere is partially collapsed or reduced in diameter and caused to close down tightly upon the core 1, as at $2^a$, Fig. 1, at which figure the original size of said sphere is indicated by dotted lines at $2^b$ and $5^b$. In other words, the rubber sphere in its original condition is considerably oversize, and by action of the dies the gutta-percha cups or hemispheres 7 and 8 are forced together over said sphere not only to weld said cups together, but also to reduce the rubber sphere in bulk. Preferably the ball is completed before the gutta-percha 1 becomes solidified, so that it may readily assume a spherical form during the closing action of the dies. It will be understood that the rubber sphere is both compressed and radially distorted, and hence put into an abnormal condition throughout, whereby it imparts to the ball phenomenal flying power, due to its increased resiliency or activity and its great expansive tendency, which serves instantly to restore the spherical shape of the gutta-percha shell when the latter is distorted by a blow. Thus it will be seen that all of the parts of the ball are brought into proper relation, both as to size and as to tense or abnormal condition, by reason of the general compression of the entire article in the dies.

It is not essential in all cases that a hard core be employed nor one that is solid, and it is practicable to combine either a seamless or a segmental rubber envelop with a core in other ways and to make other changes in the ball within the scope of my present improvements.

Having described my invention, I claim—

1. A playing-ball comprising a hard shell, a center piece, and an intermediate oversize soft-rubber shell partially collapsed and compressed between said shell and said center piece.

2. A playing-ball comprising a hard, wear-resisting cover, a distorted shell of soft rubber held under compression thereby, said shell being distorted throughout in radial directions, and a center piece within said shell.

3. A playing-ball comprising a shell of plastic material, an oversize soft-rubber seamless shell partially collapsed and confined under compression within said plastic shell, and an undersize springy center piece filling said collapsed rubber shell.

4. A playing-ball comprising a shell consisting of welded segments of gutta-percha; an oversize soft-rubber shell confined under compression within said gutta-percha shell; and a center piece of hard material within said soft-rubber shell.

5. A playing-ball comprising a center piece of plastic material; a rubber shell thereon; and a cover of hard, wear-resisting material upon said shell; the latter being in a state of partial collapse and held under compression by said cover.

6. A playing-ball comprising a shell formed of welded segments of plastic material; an oversize soft-rubber shell partially collapsed and confined under compression within said gutta-percha shell; and an undersize center piece filling said collapsed shell.

7. A playing-ball comprising a spherical center piece of gutta-percha; a seamless rubber shell thereon; and a cover of gutta-percha upon said shell; the latter being in a state of partial collapse and being held under compression by said cover.

ELEAZER KEMPSHALL.

Witnesses:
B. C. STICKNEY,
JOHN O. SEIFERT.